(No Model.)

U. P. SMITH.
PNEUMATIC WHEEL TIRE.

No. 598,823.   Patented Feb. 8, 1898.

Witnesses.
Robert Everett.
Albert H. Norris.

Inventor.
Uzziel P. Smith
By James L. Norris
atty.

THE NORRIS PETERS CO., PHOTO-LITHO., WASHINGTON, D. C.

UNITED STATES PATENT OFFICE.

UZZIEL P. SMITH, OF CHICAGO, ILLINOIS.

PNEUMATIC WHEEL-TIRE.

SPECIFICATION forming part of Letters Patent No. 598,823, dated February 8, 1898.

Application filed June 22, 1897. Serial No. 641,807. (No model.)

*To all whom it may concern:*

Be it known that I, UZZIEL P. SMITH, a citizen of the United States, residing at Chicago, in the county of Cook and State of Illinois, have invented new and useful Improvements in Pneumatic Wheel-Tires, of which the following is a specification.

It is a matter of common knowledge that ordinary pneumatic tires designed for bicycles and other wheels are seriously objectionable, due to the escape of the inflating fluid when the tire is punctured. Various constructions have heretofore been proposed with a view to avoiding the objection stated. In some instances rubber under compression has been employed for the purpose of producing a self-puncture-closing tire, reliance for this purpose being placed upon the fact that if rubber held under compression is punctured the orifice will instantly close as the puncturing instrument or object is withdrawn. This type of pneumatic tire is objectionable for several reasons, chiefly, however, because the compressed rubber being cemented throughout to a non-extensible fabric, the resiliency of the tire is thereby diminished or impaired and the rubber is held or restrained by such fabric at and about the point of the puncture when made, for which reason the rubber cannot properly act to instantly and effectually close or seal the inner part of the puncture.

The chief objects of my present invention are to entirely avoid the objections stated; to provide a new and improved pneumatic wheel-tire having rubber held constantly under compression whether the tire is inflated or deflated, so that punctures are automatically closed; to provide novel, simple, efficient, and economical means for effectually preventing leakage of the inflating fluid; to obtain the desired resiliency in a tire embodying in its structure rubber under compression; to secure a stronger and more durable article which can be easily repaired, and generally to improve pneumatic tires designed for the wheels of bicycles and other vehicles.

The objects of my invention are accomplished in the manner and by the means hereinafter described and claimed, reference being made to the accompanying drawings, in which—

Figure 1:
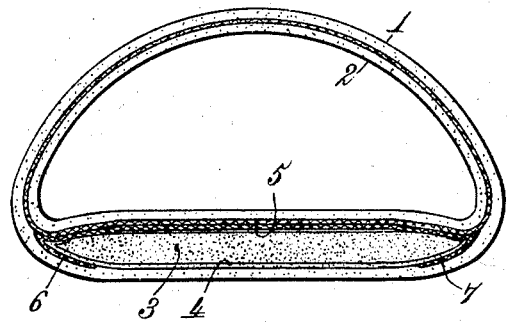
Figure 2:
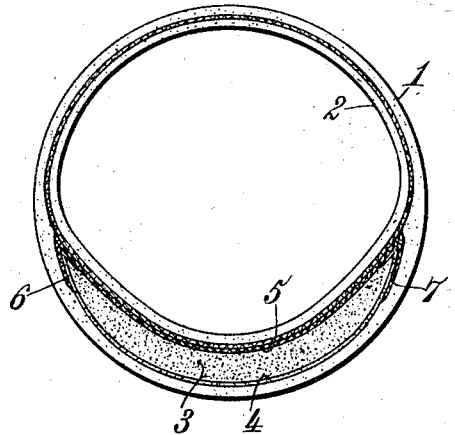
Figure 3:
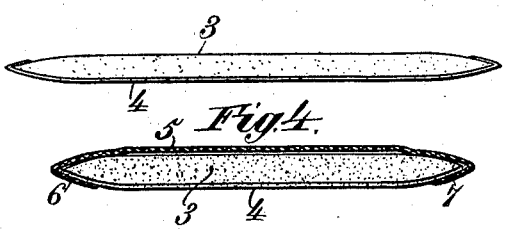
Figure 4:
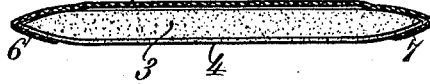
Figure 5:

Figure 1 is a transverse sectional view, on an enlarged scale, of a pneumatic tire constructed according to my invention and in its deflated condition. Fig. 2 is a similar view showing the tire in its inflated condition. Fig. 3 is a detail view indicating the manner in which the rubber is placed under compression, as will hereinafter appear. Fig. 4 is a detail view showing the rubber placed under compression and held in such condition, and Fig. 5 is a similar view showing a modification of the invention.

In order to enable those skilled in the art to make and use my invention, I will now describe the same in detail, referring to the drawings, wherein—

The numeral 1 indicates the outer casing, and 2 the inner air-tube, of a pneumatic tire. The outer casing and the inner air-tube may be of any construction and material commonly used in the manufacture of pneumatic wheel-tires, or which will fulfil the conditions required in this class of articles. The outer casing is, however, preferably composed of rubber and the inner tube of rubber or rubber compounds and canvas possessing such qualities as will enable the tube to retain the inflating fluid introduced thereinto under pressure, as usual. The tread portion of the tire is provided with a body or strip 3, composed of soft vulcanized rubber, which is compressed and held under compression, as will hereinafter appear, and which is located outside of the air-tube and is covered by the material forming a part of the outer casing. The tire in its deflated condition may be substantially semicircular in cross-section, so that the tread portion may form a chord.

To obtain a body or strip of soft vulcanized rubber which is constantly maintained under compression, I preferably employ a comparatively thin strip 4 of rubber and place the same under tension by stretching it; and while it is held in its stretched condition I secure thereupon the body or strip 3 of soft rubber of proper thickness. After the body or strip 3 is secured to the rubber strip 4 the stretched condition of the latter is relieved, and its retractile force or power will laterally compress or condense the rubber body or strip 3, and if the united parts are not held flat they will curl up. The compound strip thus produced is then covered on the side opposite the rubber strip 4 with a strip of non-extensible fabric 5, secured first at one edge 6, then carried around the compound rubber strip and secured at the other edge 7, so that a flattened body of the form shown in Fig. 4 is produced, wherein the entire body of non-extensible fabric between the points where it is attached at its opposite edge portions is entirely detached or disconnected from the compressed rubber body or strip 3. When the tire is deflated and the tread portion forms a chord, as before stated, the resiliency of the rubber strip 4 constantly tends to hold the rubber body or strip 3 under compression, and the non-extensible strip 5 maintains the compound rubber strip in a substantially flat and compressed condition, as shown in Fig. 4. This compound body, composed, essentially, of compressed rubber, is secured in the tread portion of the tire outside the air-tube by cementing or otherwise fastening the non-extensible strip 5 to the air-tube, the rubber body 3 being merely covered on the exterior by the material forming a part of the outer casing.

When the tire is inflated, the body of compressed rubber is forced outward and the tire assumes the shape shown in Fig. 2. As the tire becomes inflated the compression on the outer side of the body or strip 3 becomes somewhat lessened, due to the stretching of the rubber strip 4, but at the same time the inner side of the compressed body of rubber is additionally compressed, and the rubber body 3 being in its flat position more highly compressed on this side than on the other the stretching of the strip 4 reduces this extra compression somewhat and renders it substantially equal on both surfaces and throughout its body, so that any puncture made therein at any time will be immediately closed as soon as the puncturing instrument or object is withdrawn.

It will be obvious that under all conditions and whether the tire is inflated or deflated the body or strip of rubber is held under sufficient compression to securely close all ordinary punctures.

The body or strip 3 of soft vulcanized rubber may be secured to the stretched rubber strip 4 by any suitable cement or by vulcanization. The opposite edges of the non-extensible fabric are preferably secured by a suitable cement; but the particular means for securing these edges may be variously modified without altering the spirit of my invention.

As shown in the drawings, the tread portion of the tire forms a chord and is flattened when the tire is deflated, and when the rubber is depressed by the inflation of the tire its natural tendency is to resume its normal flat condition, and in traveling a road the compressed rubber recedes or rebounds from the road with all its natural elastic force unrestrained by any non-elastic connections, which is not the case where a non-extensible fabric is cemented or secured uniformly throughout to the compressed rubber.

In my invention the non-extensible fabric is detached or disconnected from the compressed rubber continuously between the cemented or secured edges of the non-extensible fabric, and consequently the rubber is unrestrained and left entirely free to exert all its inherent elastic power, while it is susceptible of instantly acting to close a puncture. In this respect my invention is advantageous and important and a decided improvement over those tires where a non-extensible fabric is placed on the exterior of the compressed rubber and is thereby the part which is first punctured, in consequence of which it is soon seriously damaged.

It has been proposed to construct a tire which is concavo-convex on its opposite sides when deflated, so that when inflated the rubber forming the tread portion will be laterally compressed, a non-extensible fabric being cemented to the outer surface of the rubber tire to hold it from stretching at the outer side when the concavo tread portion of the tire is pressed outward during inflation. In the practical use of such a tire the pressure of the weight of the rider causes the tread portion to become more or less flattened, which is the only point where punctures occur, and obviously the flattening of the tread portion greatly reduces the compressed condition of the rubber, so that it is ineffectual in closing punctures made therein, and if deflated after being punctured it cannot be practicably again inflated, as the air will escape more or less through the inner part of the puncture, which is stretched open by the inverse curve of the tread portion when the tire is deflated.

In a tire constructed according to my invention the compression of the rubber body is constant and is never diminished or lessened without regard to whether the tire be inflated or deflated, and the compression is always sufficient to instantly close any puncture ordinarily made. The constant compression of the rubber renders it possible to inflate the tire at any time if it has been punctured and deflated, because the body 4, of rubber, is held under compression and closes the puncture under all conditions.

It has also been proposed to construct a pneumatic tire of non-stretching material and an inner layer of thick rubber in a condition of inwardly-progressive compression, the tire being circular in cross-section when deflated and the non-stretching material being cemented throughout to the inner layer of thick rubber. This is objectionable in that the desired resiliency of the tire is not permitted and its elasticity is decreased or impaired, while the compressed rubber itself has no power to act at the point where it is cemented or secured to the non-stretching material.

The desired elasticity of the tire is obtained in my invention from the fact that the compressed rubber when forced outward by the inflation of the tire constantly tends to resume its normal flat condition, and therefore in traveling a road it recedes or rebounds with all its natural elastic force unrestrained by any non-elastic material between the points where the edge portions of the non-elastic material are cemented or secured to the compressed rubber body.

I do not wish to be understood as confining myself to the particular method described for placing the body of soft vulcanized rubber under compression, as this may be accomplished by any means which will produce the same result, or to other details, especially as to the form or minor features.

In the modification illustrated by Fig. 5 of the drawings the construction is the same as described with reference to the other figures, with the exception that a thin layer 8 of rubber is arranged between the compressed-rubber body 3 and the non-extensible fabric 5 and cemented to the compressed-rubber body 3 at its outer edges only, and when the tire is inflated this thin layer of rubber is pressed down upon the compressed-rubber body and aids somewhat in closing the surface of the hole made by a puncture and enables the use of a thinner body of compressed rubber than otherwise.

Having thus described my invention, what I claim is—

1. An inflatable wheel-tire having a compressed body of rubber between the outer casing and inner air-tube and disconnected therefrom between its edge portions, substantially as described.

2. An inflatable wheel-tire having a tread portion forming a chord when the tire is deflated, and comprising a compressed body of rubber located wholly outside the air-tube and provided at its inner side with non-extensible fabric secured at its edge portions to the compressed rubber and disconnected from said rubber between said secured edges, substantially as described.

3. An inflatable wheel-tire having a tread portion comprising a compressed body of rubber located wholly outside the air-tube and provided at its inner side with non-extensible fabric secured at its edge portions to edge portions of the compressed rubber and disconnected from the latter between said secured edges, substantially as described.

4. An inflatable wheel-tire having a tread portion forming a chord when the tire is deflated, and containing a body of rubber under compression, located outside the air-tube, and disconnected and detached therefrom and from the non-extensible fabric present in the tire between its edge portions, substantially as described.

In testimony whereof I have hereunto set my hand in presence of two subscribing witnesses.

UZZIEL P. SMITH.

Witnesses:
 ALBERT H. NORRIS,
 F. B. KEEFER.